March 18, 1958 H. W. WETZEL 2,827,326
COLLAPSIBLE CAMP TRAILER BODY
Filed Oct. 12, 1953 4 Sheets-Sheet 1
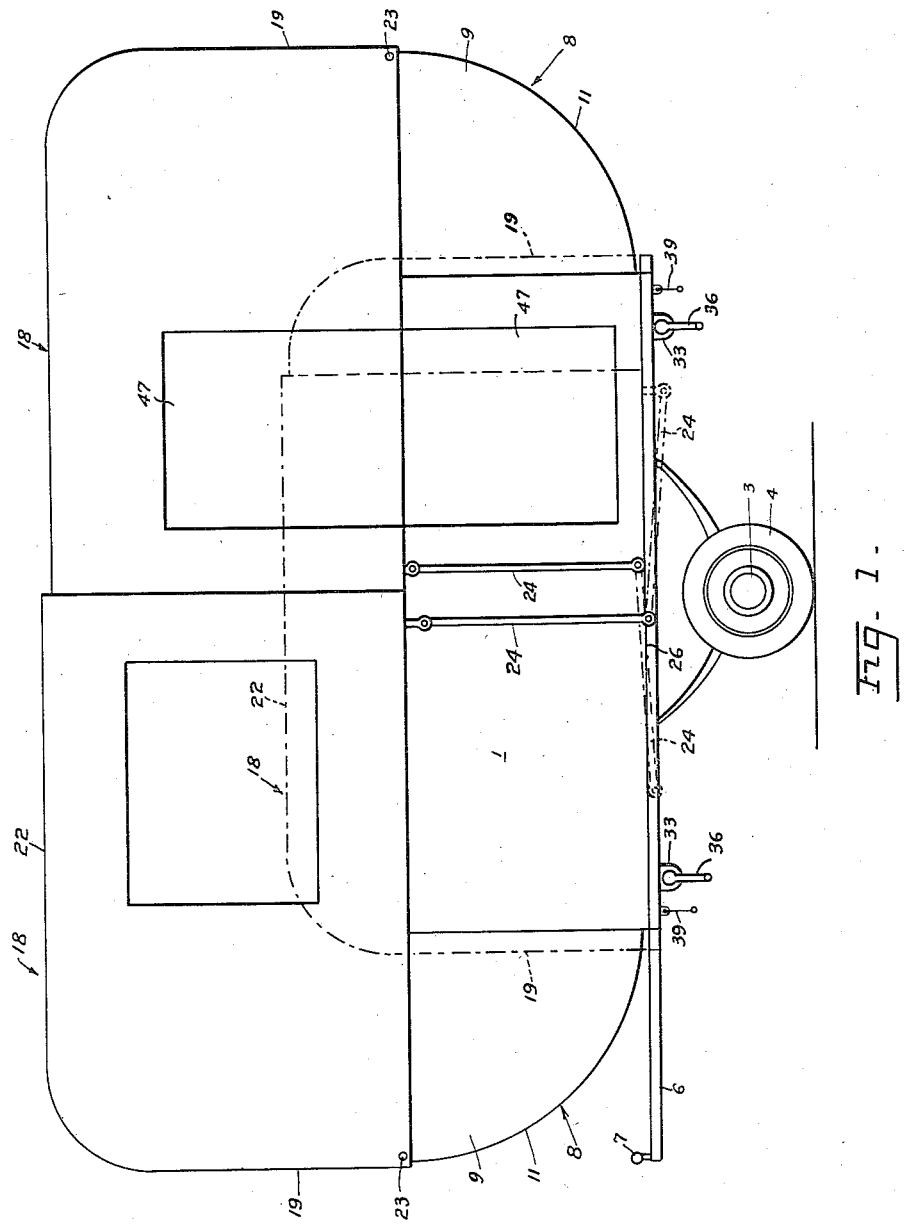
INVENTOR.
HOWARD W. WETZEL
BY George B White
ATTORNEY

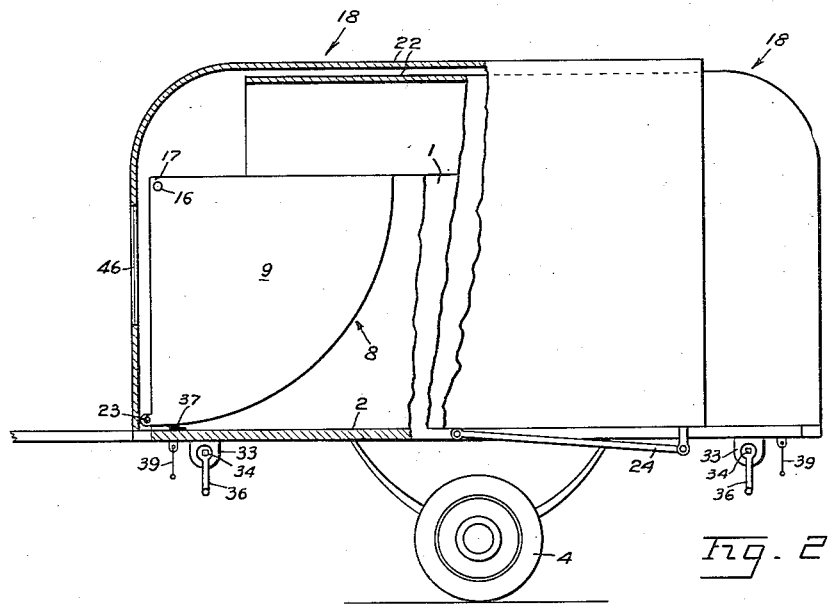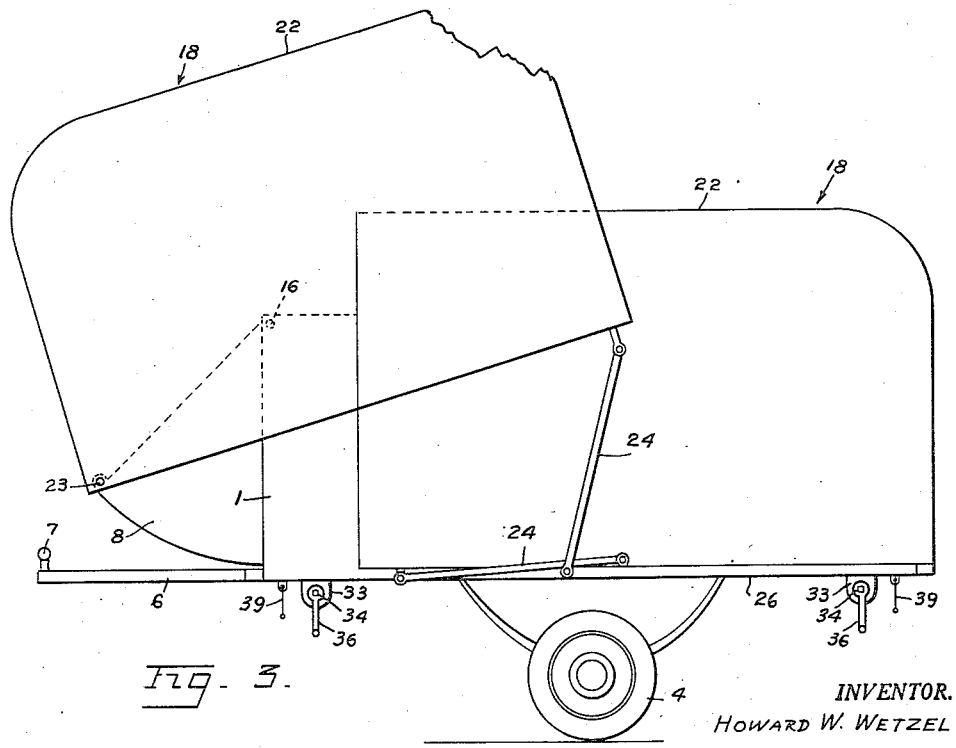

March 18, 1958 H. W. WETZEL 2,827,326
COLLAPSIBLE CAMP TRAILER BODY
Filed Oct. 12, 1953 4 Sheets-Sheet 3

INVENTOR.
HOWARD W. WETZEL
BY George B White
ATTORNEY

March 18, 1958     H. W. WETZEL     2,827,326
COLLAPSIBLE CAMP TRAILER BODY
Filed Oct. 12, 1953     4 Sheets-Sheet 4

INVENTOR.
HOWARD W. WETZEL
BY
*George B. White*
ATTORNEY

United States Patent Office 2,827,326
Patented Mar. 18, 1958

2,827,326

COLLAPSIBLE CAMP TRAILER BODY

Howard W. Wetzel, San Rafael, Calif.

Application October 12, 1953, Serial No. 385,545

10 Claims. (Cl. 296—23)

This invention relates to a camp trailer.

The primary object of this invention is to provide a collapsible camp trailer which in its folded position is lowered and shortened to a convenient size for towing behind a vehicle, such as an automobile, reducing the bulk and decreasing interference with the driving of the vehicle.

Further objects of the invention are to provide a camp trailer which in its fully extended position offers a spacious compartment for habitable and comfortable room, and which can be easily and quickly folded so that the bulk thereof is reduced both vertically and longitudinally at the same time into a compact securely folded and closed unit which can be readily and easily towed by the average passenger vehicle or the like, and which can be easily extended at will.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a side view of my trailer in unfolded position in full lines, the contracted folded position being shown in dotted lines.

Fig. 2 is a partly sectional side view showing one of the folded or collapsed end sections broken away.

Fig. 3 is a side view showing one of the end sections partly raised and extended.

Figure 4:
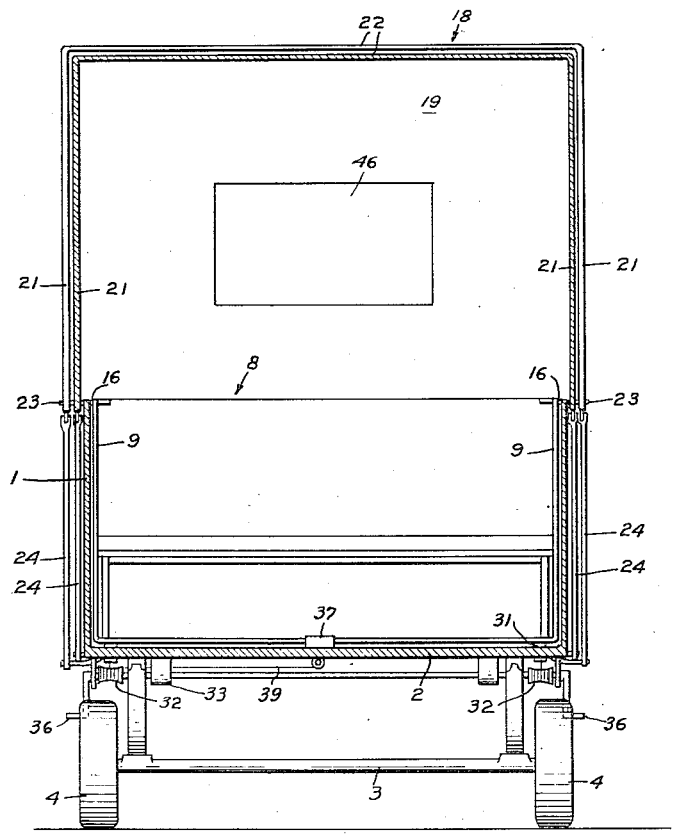
Fig. 4 is a cross-sectional view of the trailer in extended position.

In the preferred embodiment of my invention I make use of a pair of stationary side sections 1 which are opposite and are spaced from one another by suitable frame and floor structure 2. On the underside of the floor structure 2 I provide suitable axles 3 on which are a pair of wheels 4 for supporting the trailer in the usual manner. Converging bars 6 extend forwardly from floor structure 2 and terminate at their forward end in a hitching device 7 of any suitable type for quick connection to the towing element of the vehicle.

At each end of the structure formed by the stationary side sections 1 and the floor structure 2 is provided a swingable end section 8 extending the entire width of the trailer between the stationary side sections 1. Each swingable end section 8 has opposed side plates 9 and an arcuate end wall 11. Each side plate 9 is in the shape of a sector corresponding generally to a quarter of a circle so that as the vertical plate edge 12 of the plate 9 is in the vertical position, then the other edge 13 of the plate 9 is in the horizontal position. In other words, the radial straight edges including the sector plate 9 are at right angles to one another and the third edge of the sector is formed by a quarter circle arc edge 14. The end wall 11 is so curved that it corresponds to the arc edges 14 of the sector plates 9.

The corner of each sector plate 9 at about the intersection of the straight edges 12 and 13 is connected by a pivot 16 to the adjacent upper corner 17 at the adjacent stationary side section 1 so that the sector plates 9 are swingable around the horizontal pivot 16 in planes parallel with the respective stationary side sections 1. When the entire end section 8 is swung inwardly into the space between the stationary side sections 1 the vertical edge 12 swings up and inwardly of this trailer while the previously horizontal edge 13 swings downwardly to a vertical position. Thereby the entire swingable end section 8 is concealed within the trailer space between the stationary side sections 1.

To each of the swingable end sections 8 is secured a swingable top section 18. Each top section 18 includes an end wall 19 which is substantially contiguous with the upper horizontal edge of the end wall 11 of the adjacent end section 8. Side walls 21 extend from the opposite vertical edges of the end wall 19 so as to be generally contiguous with the respective end sector plates 9 and with the stationary side sections 1 and each extends substantially one half of the extended length of the trailer. A top wall 22 covers the space between the end wall 19 and the side wall 21. Each top section 18 is supported on opposite pivots 23 journalled in the outer top corners of the respective sector plates 9 when the trailer is extended so that as the respective sector plates 9 are swung downwardly and inwardly of the trailer the respective top section 18 is also pulled down and inwardly of the stationary sides 1 of the trailer into folded position. In view of the fact that the top sections 18 also overlap one another in the folded position, one of the top sections is made of such dimensions that it telescopes within the other top section as shown.

Various means may be provided for guiding the free ends of each top section 18. In the present illustration near the free end of each top section 18 is pivoted a rod 24, the other end of which latter is pivoted near the lower edge 26 of the adjacent stationary side sections 1. Normally in the extended position, each rod 24 is vertical and as the top section is pulled downwardly and inwardly the rod swings with it and guides the lower edge of the top section 18 to its overlapping position. The respective rods 24 are so located and spaced that when the top sections are in folded telescoped position, the rods 24 at the same side cross one another without interfering with the relative movements.

For the manipulation of the trailer for folding and unfolding the aforesaid relatively movable sections various simple mechanisms can be arranged for the purpose of applying the force to the sector plates for swinging the end section 8 inwardly or outwardly and accordingly to pull down or raise the respective top sections 18.

Figure 7:
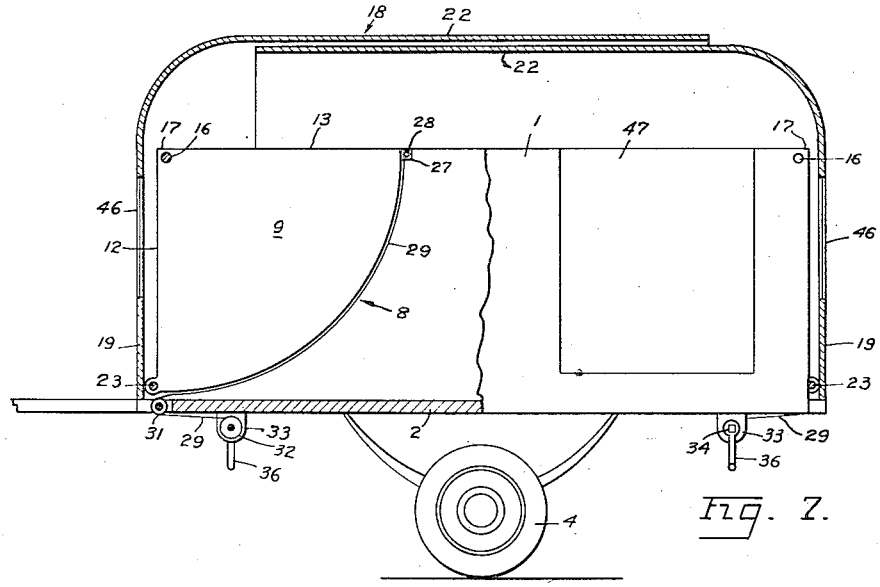
Fig. 7 is a partly sectional side view of the trailer showing the extending mechanism.

In Fig. 7 I illustrate a manipulator which includes a pair of spaced brackets 27 extended to a cross bar 28 of the end section 8 to each of which brackets is fixed the end of a line 29, which line is preferably made of wire. This line 29 is played around a pulley 31 journaled in the floor structure 2 and then the line 29 is played around and anchored to a tube 32 journalled in suitable brackets 33 on the underside of the floor structure 2 of the trailer. This tube 32 is suitably adapted, such as by square socket 34, to be engaged by a crank arm 36 for cranking the same thereby setting the same in a clockwise direction viewing Fig. 7 so as to exert a pull upon the line 29 and pull the brackets 27 and the entire end section 8 outwardly. The respective brackets 27 and line 29 are near the opposite ends of the swingable end section 8.

In this form the swingable end sections 8 are held in this extended position by a suitable catch, for instance, by hinge catch 37 pivoted to the inside face of the floor structure 2 and pushed apart by a spring 38 so that as the curved end wall 11 passes over outwardly and off the hinge catch 37, the latter will spring upwardly so as to abut against the inner edge of the curved end wall 11 and thereby to prevent the swinging of the swingable end section 8 inwardly. A manipulating line or wire 39 is extended through the floor board and is anchored to the swingable part of the hinge catch 37 so that the operator may pull the wire 39 and pull the hinge catch 37 down from the obstructing position for permitting the folding of the trailer. Inasmuch as the space within the swingable end section 8 is used for storage, upon release of the hinge catch 37 it will swing inwardly into the folded position by its own weight. It is understood that the tube 32 is free to rotate and allows such folding.

Figure 8:
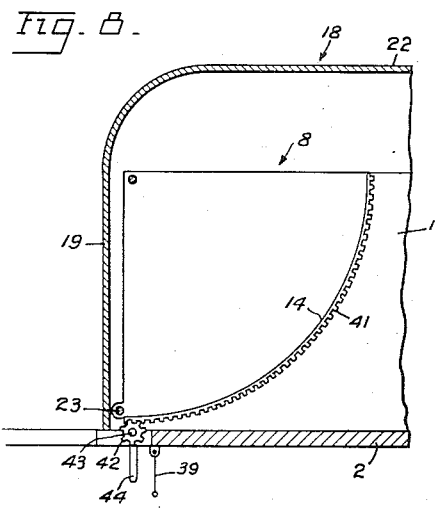
Fig. 8 is a fragmental partly sectional view of an end of the trailer with arcuate rack and pinion mechanism.

Another form of manipulation for folding and unfolding of the swingable end section 8 is shown in Fig. 8 in which sector gears or teeth 41 are provided on the periphery of the curved arc edge 14 of each sector plate 9. A pair of gears or pinions 42 are provided at each end so as to be in mesh with the sector rack or gear 41. A shaft 43 engages both pinions 42 and is engageable by crank arm 44, so that as the shaft 43 is turned or cranked it turns the pinions 42 and thereby raises or lowers the swingable end sections 8. In this form by locking the gear shaft 43 the sections can be held in the unfolded or extended position. In the alternative the hinge catch 37 can be utilized.

Windows 46 are provided in each end wall 19 of each top section 8 for the purpose of the usual ventilation and light. A pair of hinged door sections 47 are provided; one on one top section 18 and the other on the adjacent side section 1 on the same side, so arranged that when the top sections 18 are in the extended or unfolded position, the door sections 47 are in vertical alignment and contiguous providing the effect of a complete door in two sections which can be suitably opened and closed.

Figures 5, 6:
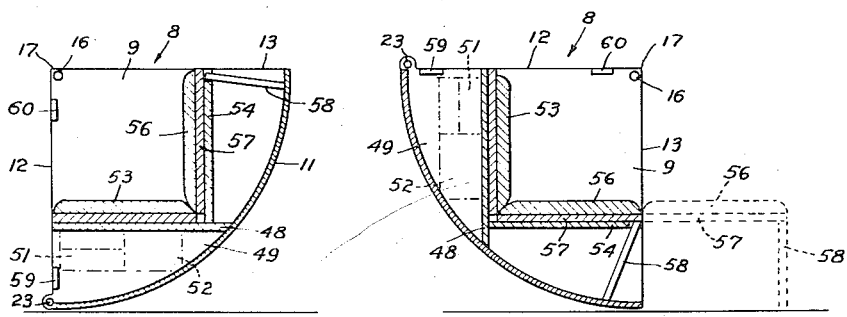
Fig. 5 is a detail view of the swingable end section with seat arrangement in collapsed position.
Fig. 6 is a detail view of a swingable end section extended and formed into a bed.

The interior of the trailer may be suitably furnished. It is preferable that the bed be provided in the swingable end section 8 so that it can be readily swung into folded or extended position without any additional operation. As shown in Fig. 5 in each end section there is provided a back wall 48 spaced from the outer curved end wall 11 so as to provide a compartment or pocket 49 within which a hammock bed frame 51 with the usual canvas 52 thereon can be concealed. The inner face of the back wall 48 is covered by a suitable back cushion 53. Spaced from the bottom of the curved wall 11 is a bed board 54 on which is the usual seat cushion 56. The seat cushion 56 has a rigid frame board 57 thereunder resting on the bed board 54 and is slidable inwardly of the trailer. On the outer corners of the frame board 57 are pivoted legs 58 so arranged that when extended they rest on the floor and provide a bed support. By placing the seat cushion in place a lower bed can be provided.

On the inside of each swingable end section 8 and along the inside of the vertical and horizontal straight edges 12 and 13 of each end sector plate 9 are supporting flanges 59 and 60 adapted to support thereon the spare bed frame 51 heretofore described. In this manner another sleeping accommodation can be provided.

Figure 10:
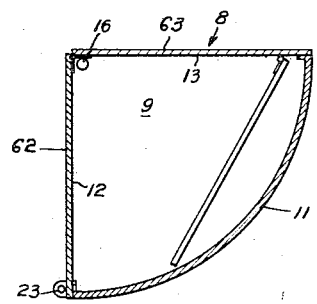
Fig. 10 is a sectional detail view of a modified bed arrangement in the arcuate end section.
Figure 9:
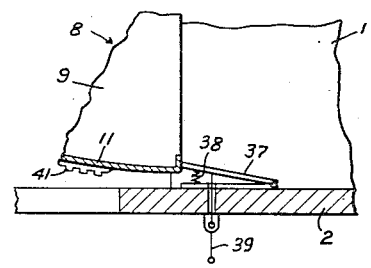
Fig. 9 is a fragmental detail of the catch to hold the end section in extended position.

In another form shown in Fig. 10 the bed board 62 is extended fixedly between the horizontal edges 13 of the end sector plate 9 so that a bed may be made up on the same. On the outer longitudinal edge is a hinged flap 63 to cover the space thereunder, and to be held in horizontal position at will to form a wider bed.

I claim:

1. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and connecting means between each top section and said middle section to hold said top section generally upright both in folded and unfolded positions.

2. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, pivotal support means connecting said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, each arcuate end section including an arcuate end wall, the concave side of said end wall facing inwardly of said middle section when extended, and an end member at each end of said arcuate end wall supported on said pivotal supporting means, and connecting means between each top section and said middle section to hold said top section generally upright both in folded and unfolded positions.

3. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby in generally upright position respectively downwardly and inwardly and upwardly and outwardly with respect to said middle section, said top section when extended forming the top half of the trailer compartment complementing about a half of said middle section and the entire adjacent arcuate end section, and means for swinging said arcuate end sections respectively to extended and telescoped positions.

4. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and means for swinging said arcuate end sections respectively to extended and telescoped positions, said swinging means including a pulling line secured to the lower inner portion of the arcuate section, and a winding mechanism to wind said line so as to pull it outwardly with respect to said middle section so as to turn said arcuate section outwardly and upwardly.

5. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and means for swinging said arcuate end sections respectively to extended and telescoped positions, said swinging means including a pulling line secured to the lower inner portion of the arcuate section, and a winding mechanism to wind said line so as to pull it outwardly with respect to said middle section so as to turn said arcuate section outwardly and upwardly, and a releasable holding device to hold said arcuate end section in extended position.

6. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and means for swinging said arcuate end sections respectively to extended and telescoped positions, said last means including an arcuate rack on each arcuate end section, and an operating mechanism including a pinion in engagement with said rack for turning said arcuate end section about said pivotal support.

7. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and connecting means between the inner ends of each top section and said middle section for guiding the inner ends of said top sections for moving generally in accordance with the swinging of the outer end of each top section and holding said top section generally upright.

8. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, and a pivoted swinging rigid link connected to each inner lower end of each top section and to the middle section to cause said inner end to move in accordance with the swinging of the outer end of each top section and hold said top section upright.

9. In a trailer of the character described, a relatively stationary middle section including upwardly projecting structure thereon, a telescoping complemental foldable section swingably supported on said structure at each end of the middle section, said sections together inclosing a trailer compartment when unfolded; each foldable section including an arcuate end section, said arcuate end section including an arcuate closure panel and sector panels along opposite edges of said panel, pivotal support means connecting said sector panels of said arcuate end section to said structure at the adjacent end of said middle section so as to allow said arcuate end section to swing downwardly and inwardly into said middle section and upwardly and outwardly from said middle section, and a top section pivotally connected at its outer end to said arcuate end section to be swung thereby respectively downwardly and inwardly and upwardly and outwardly with respect to said middle section, said top section when extended forming the top half of the trailer compartment complementing about a half of said middle section and the entire adjacent arcuate end section, each arcuate end section including an arcuate end wall, the concave side of said end wall facing inwardly of said middle section when extended, a side member at each end of said arcuate end wall supported on said pivotal supporting means.

10. In a trailer of the character described, a relatively stationary bottom section having upwardly projecting structures thereon, a telescoping complemental foldable section swingably supported on said structure, said sections together inclosing a trailer compartment when unfolded; said foldable sections including an arcuate end section, said arcuate end section including an arcuate closure panel and sector panels along opposite edges of said panel, pivotal support means connecting said sector panels of said arcuate end section to said structure at an end of said stationary section so as to allow said arcuate end section to swing downwardly and inwardly into said end of said stationary section and upwardly and outwardly from said stationary section, and a top section pivotally connected at its adjacent end to said arcuate end section to be swung thereby respectively downwardly and inwardly and upwardly and outwardly with respect to said stationary section, said top section when extended forming a top half of the trailer compartment complementing the said stationary section and the said arcuate end section, and pivoted swinging means connected to the other end of the top section and to said structure of the stationary section to cause said other end to move in accordance with the swinging of the first end of the top section and hold said top section upright both in extended and stationary position.

References Cited in the file of this patent

UNITED STATES PATENTS

| | | |
|---|---|---|
| D. 144,748 | Weissberg | May 14, 1946 |
| 360,153 | Hinton et al. | Mar. 29, 1887 |
| 1,946,164 | Houdashelt | Feb. 6, 1934 |
| 2,003,598 | Lehrer et al. | June 4, 1935 |
| 2,015,176 | Ebenhack | Sept. 24, 1935 |
| 2,154,810 | Goedderiz | Apr. 18, 1939 |
| 2,475,928 | Walls | July 12, 1949 |
| 2,646,309 | Tuson | July 31, 1953 |

FOREIGN PATENTS

| | | |
|---|---|---|
| 508,536 | Belgium | Feb. 12, 1952 |
| 475,793 | Canada | Aug. 7, 1951 |
| | Corresponding U. S. 2,686,075, Aug. 10, 1954 | |
| 590,029 | Great Britain | July 7, 1947 |